US006971667B2

(12) United States Patent
Enders et al.

(10) Patent No.: US 6,971,667 B2
(45) Date of Patent: Dec. 6, 2005

(54) GLOVE COMPARTMENT AIRBAG SYSTEM

(75) Inventors: Mark L. Enders, Pleasant View, UT (US); Bradley W. Smith, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 87 days.

(21) Appl. No.: 10/342,642

(22) Filed: Jan. 14, 2003

(65) Prior Publication Data

US 2004/0135353 A1 Jul. 15, 2004

(51) Int. Cl.[7] .............................................. B60R 21/22
(52) U.S. Cl. ................. 280/730.1; 280/743.1; 280/753; 296/37.12; 292/144
(58) Field of Search .............................. 280/730.1, 732, 280/728.2, 728.3, 743.1, 752, 753; 296/37.12; 292/144

(56) References Cited

U.S. PATENT DOCUMENTS

| 4,427,215 | A |   | 1/1984  | Weichenrieder et al. ..... 280/752 |
|-----------|---|---|---------|------------------------------------|
| 5,044,678 | A | * | 9/1991  | Detweiler .................... 292/144 |
| 5,443,285 | A |   | 8/1995  | Boll ............................ 280/732 |
| 5,615,914 | A |   | 4/1997  | Galbraith et al. ......... 280/743.1 |
| 5,752,717 | A |   | 5/1998  | Galbraith et al. ......... 280/743.1 |
| 5,839,756 | A |   | 11/1998 | Schenck et al. .......... 280/743.1 |
| 5,868,422 | A |   | 2/1999  | Galbraith et al. ........... 280/732 |
| 6,039,380 | A |   | 3/2000  | Heilig et al. .................. 296/70 |
| 6,092,836 | A | * | 7/2000  | Saslecov .................. 280/730.1 |
| 6,213,497 | B1 |  | 4/2001  | Spencer et al. .......... 280/730.1 |
| 6,276,713 | B1 |  | 8/2001  | Duletzke ..................... 280/732 |
| 6,302,437 | B1 | * | 10/2001 | Marriott et al. ............. 280/732 |
| 6,712,385 | B2 | * | 3/2004  | Enders ..................... 280/730.1 |

FOREIGN PATENT DOCUMENTS

| DE | 4209604      |    | 10/1992  | ........... B60R 21/45  |
|----|--------------|----|----------|-------------------------|
| DE | 19617403 A1  | *  | 11/1997  | ........... B60R 7/06   |
| DE | 19842672 A1  | *  | 3/2000   | ......... B60R 21/045   |
| DE | 10122904 C1  | *  | 11/2002  | ........... B60R 21/22  |
| FR | 2814413 A1   | *  | 3/2002   | ........... B60R 21/20  |
| GB | 2357466      |    | 6/2001   | ........... B60R 21/20  |

* cited by examiner

Primary Examiner—Peter C. English
(74) Attorney, Agent, or Firm—Sally J. Brown

(57) ABSTRACT

A glove compartment assembly incorporates a compact airbag module with a cushion constructed at least partially of a rigid material. The cushion may be sandwiched between front and rear door covers so that inflation of the cushion moves the front door cover toward the knees of a vehicle user to provide antisubmarining protection. The cushion may incorporate the front door cover as a portion of its inflation gas-containing membrane. The glove compartment assembly may utilize a uniquely designed latching system, such as an electric latching assembly, a latching assembly disposed generally off the door, or a break-away latching assembly disposed generally on the front door cover, to permit motion of the front door cover away from the instrument panel without interfering with the airbag module.

7 Claims, 7 Drawing Sheets

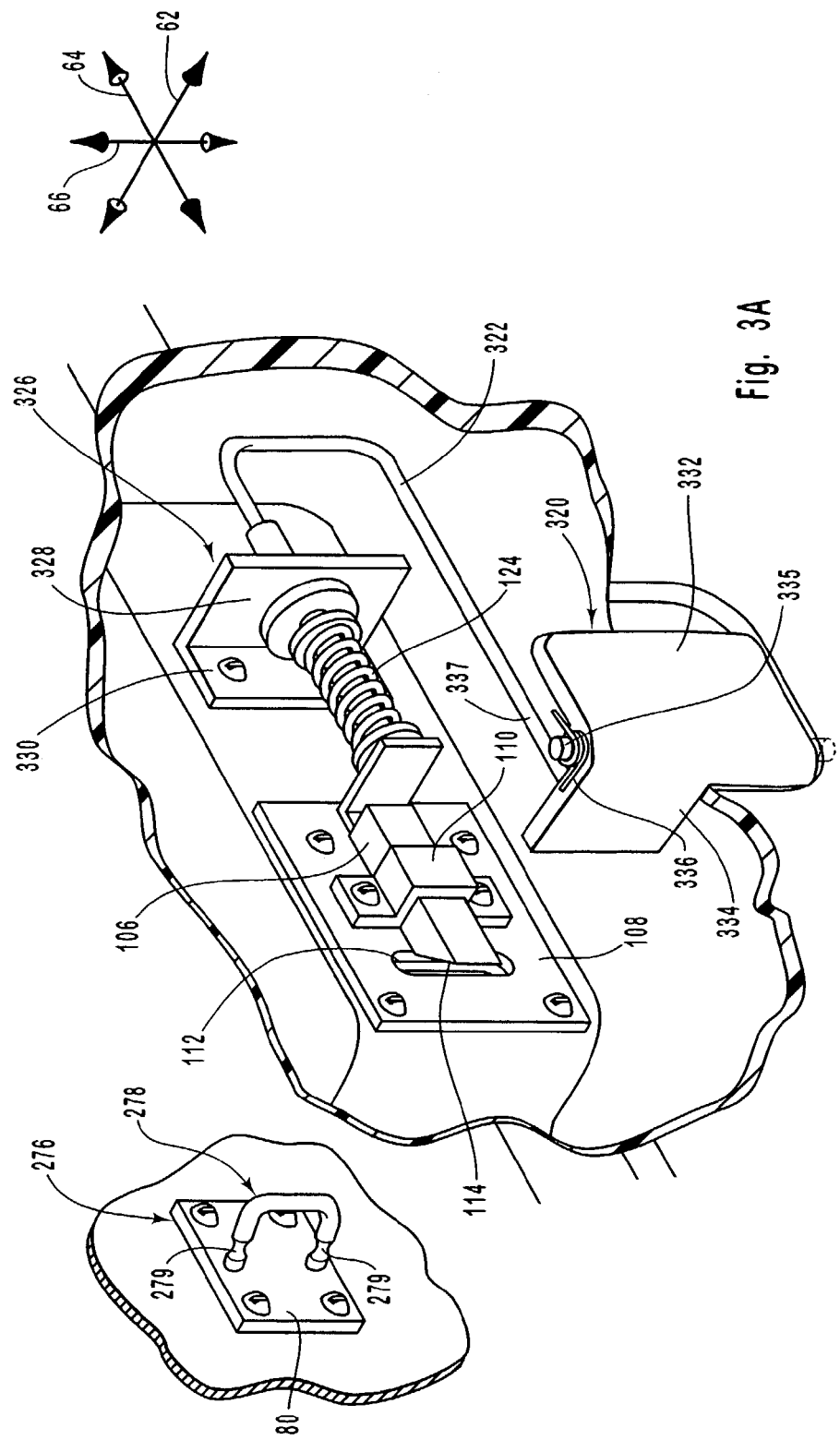

GLOVE COMPARTMENT AIRBAG SYSTEM

BACKGROUND OF THE INVENTION

1. Field of the Invention

The present invention relates to systems and methods for protecting vehicle occupants from injury. More specifically, the present invention relates to glove compartments with incorporated airbags.

2. Description of Related Art

The inclusion of inflatable safety restraint devices, or airbags, is now a legal requirement for many new vehicles. Airbags are typically installed in the steering wheel and in the dashboard on the passenger side of a car. Additionally, airbags may be installed to inflate beside the passenger to provide side impact protection, in front of the knees to protect the knees and/or maintain the posture of the occupant during impact, or at other strategic locations.

In the event of an accident, an accelerometer within the vehicle measures the abnormal deceleration and triggers the ignition of an explosive charge. Expanding gases from the charge fill the airbags, which immediately inflate to protect the driver and/or passengers from impact against the interior surfaces of the vehicle. During normal vehicle operation, airbags are typically stowed behind covers to protect them from tampering and to provide a more attractive interior facade for the vehicle.

Typically, the expanding gases are expelled into the cushion from an inflator that contains the gas in compressed form or generates gas through the ignition of a pyrotechnic. In certain airbag modules, the inflator is positioned within the cushion. Thus, the inflation gas is able to reach the cushion faster, and installation of the module may be simplified.

One known problem with many known frontal airbag systems acting alone is that a vehicle occupant may "submarine," or slide underneath the primary frontal airbag during impact. Hence, "knee bolster" airbags have been developed to receive the knees of the vehicle occupant, thereby limiting not only the potential for knee injury, but also the occupant's tendency to slide underneath the primary airbag.

Unfortunately, many such knee bolster airbags are somewhat bulky, even when folded, and therefore require excessive space in the instrument panel. Passenger side mounting is difficult because the glove compartment may interfere with the intended position of the knee bolster airbag. As a consequence, significant instrument panel redesign may be required to accommodate the knee bolster airbag.

Furthermore, many known knee bolster systems are somewhat costly due to the number of parts required to install the airbag system in the vehicle and enable it to deploy. Such systems typically utilize fabric airbags, which may require considerable mounting hardware.

Accordingly, it would be an advancement in the art to provide a glove compartment assembly that incorporates a relatively compact airbag. Preferably, such a glove compartment assembly should be installable in a vehicle with a minimum of instrument panel redesign. Furthermore, such a glove compartment assembly should preferably involve a minimum of parts so that the glove compartment assembly is inexpensive and easy to manufacture.

SUMMARY OF THE INVENTION

The apparatus and method of the present invention have been developed in response to the present state of the art, and in particular, in response to the problems and needs in the art that have not yet been fully solved by currently available airbag systems and methods. Thus, the present invention provides glove compartment assemblies and associated methods that are capable of improving the art. Such assemblies and methods may simplify the design of the instrument panel, facilitate manufacturing and installation of the glove compartment assembly, and decrease the overall cost of the airbag system.

In accordance with the invention as embodied and broadly described herein in one embodiment, an enhanced glove compartment assembly is provided. The glove compartment assembly incorporates an airbag module that deploys upon impact to cushion the knees of a vehicle occupant, thereby protecting the occupant's knees and preventing the occupant's lower body from sliding underneath the primary airbag.

The airbag module has a cushion constructed of a comparatively rigid material such as steel, aluminum, plastic, or a composite material. More precisely, the airbag module takes the form of a folded rigid knee airbag mounted within a door of the glove compartment. The airbag module also has an inflator disposed generally inside the cushion, or within an inflator alcove in fluid communication with the cushion.

The glove compartment assembly includes a storage bin and a door. The storage bin includes a recessed compartment designed to hold articles. A restraint member is attached to the storage bin, and includes a loop that extends toward the door. The door includes a rear door cover, the airbag module, and a front door cover. The rear door cover is pivotally attached to the storage bin so that the door is able to swing open to provide user access to the storage bin.

The rear door cover includes a central portion to which the airbag module is attached. A peripheral lip encircles the central portion. A recess is formed in the central portion. The recess has a latch portion designed to contain a latching assembly and an inflator portion that contains the inflator of the airbag module.

The latching assembly is electrically operated. More specifically, the latching assembly includes a latching block slidably attached to the latch portion of the recess. The latching block is positioned to interlock with the retaining member when the door is closed. The loop of the retaining member moves through a slot in the rear door cover to reach the latching block. The latching block has a sloped face that permits the latching block to slide into the interlocking position with the retaining member when the door is closed.

The latching block is actuated by a solenoid via a push rod that connects the latching block to the solenoid. The solenoid is triggered by a user control, which may take the form of an electric switch or button. The electric switch is attached to the front door cover, and is connected to the remainder of the latching assembly by a switch wire long enough to extend around the airbag module and to allow the electric switch to extend away from the rear door cover when the cushion inflates.

The central portion of the rear door cover has a plurality of holes aligned with holes of the airbag module. Fasteners, such as screws, bolts, rivets, or the like are used to attach the cushion to the central portion.

The cushion has a rear panel and a front panel, which are attached together to define an expandable interior volume. The fasteners extend only through attachment holes of the rear panel so as not to interfere with inflation of the cushion. The rear panel has transverse folds and lateral folds designed to permit the rear panel to expand so that the front and rear panels are able to separate upon inflation of the cushion. The front and rear panels are attached at their edges. Fasteners may be used to attach the front and rear panels together, and to attach the cushion to the front door cover.

The front door cover has a peripheral lip designed to be attached to the peripheral lip of the rear door cover to generally enclose the airbag module between the front and rear door covers. A plurality of frangible attachment members protrude from the peripheral lip of the front door cover into corresponding holes of the peripheral lip of the rear door cover.

When the cushion inflates, the front door cover is pressed away from the rear door cover, and the frangible attachment members break in response to the pressure. The expanding cushion continues to press the front door cover away from the rear door cover and toward the vehicle occupant. The extra length of the switch wire is drawn along the cushion, and does not impede separation of the front and rear door covers.

According to one alternative embodiment, a glove compartment assembly according to the invention also includes a storage bin and a door. Like that of the previous embodiment, the storage bin has a restraint member. The restraint member includes a loop with a pair of weakened portions. The storage bin may be somewhat taller (i.e., in the transverse direction) than that of the previous embodiment.

The door includes a rear door cover, an airbag module, and a front door cover. The rear door cover is somewhat similar to that of the previous embodiment. The rear door cover has a central portion encircled by a peripheral lip. The central portion has a recess with only an inflator portion. The latching assembly, with the exception of the restraint member, is disposed on the front door cover.

The latching assembly is mechanically operated. More precisely, the latching assembly has a latching block disposed in the front door cover to interlock with the restraint member. The latching block is coupled to a user control that is partially exposed through the front door cover. The user control takes the form of a handle that can be gripped and pivoted by a user. The handle is coupled to the latching block via a control rod such that pivotal motion of the handle results in withdrawal of the latching block from interlocking with the restraint member.

The front door cover has a latching portion and a cushion attachment portion; the latching portion is disposed above the cushion attachment portion. The latching portion is somewhat thicker than the cushion attachment portion, so that the latching portion extends over the cushion and the rear door cover to abut the storage bin. The handle, latching block, and control rod are disposed in the latching portion so as not to interfere with the airbag module.

The airbag module is configured in a manner similar to that of the previous embodiment. The airbag module is generally enclosed by the rear door cover and the cushion attachment portion of the front door cover. More specifically, the cushion attachment portion also has a peripheral lip designed to be joined to the peripheral lip of the rear cushion portion via one or more frangible fastening mechanisms.

When an accident occurs, the inflator inflates the cushion, and the frangible fastening mechanisms break to permit the front door cover to move away from the rear door cover, toward the occupant. The restraint member breaks via the weakened portions to permit the front door cover to move away from the storage bin. Thus, the front door cover moves toward the occupant's knees to provide antisubmarining protection. Such a latching assembly may be called a "breakaway latch."

According to another alternative embodiment, a glove compartment assembly according to the invention has a storage bin that is attached to the door. The storage bin and the door are pivotally attached to the instrument panel so that the storage bin is able to rotate out of a compartment of the instrument panel for user access. The compartment has a forward wall with a slot, and a rearward wall behind the forward wall. A latching assembly is attached to the rearward wall and to the instrument panel.

More specifically, the latching assembly includes a handle, like that described above, that is accessible through a window in the instrument panel. The handle is coupled to a latching block disposed on the rearward wall. The latching block is configured to interlock with a restraint member positioned on the door. When the door is closed, the restraint member extends through the slot and is retained by the latching block.

The door includes a rear door cover, much like that of the previous embodiment, which is attached to the storage bin. Additionally, the door includes an airbag module with a cushion that has a rear panel, constructed of a stiff material such as steel, and a front door cover attached to the rear panel. No front panel is needed for the cushion. Rather, inflation gas is trapped directly between the rear panel and the front door cover. As with previous embodiments, the front door cover has a peripheral rim attached to a peripheral rim of the rear door cover via one or more frangible fastening mechanisms.

Thus, in the event of an accident, inflation gas is produced between the rear panel and the front door cover. The front door cover extends toward the vehicle occupant's knees to provide antisubmarining protection. The latch is not disposed in the door, and therefore does not interfere with the placement or operation of the airbag module.

Through the use of the glove compartment assemblies and associated methods of the present invention, antisubmarining protection may be economically and compactly provided for automobile passengers. Such benefits may be achieved through the use of simple airbag modules constructed of rigid materials, and via latching mechanisms that are configured to avoid interference with the airbag module.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3A is an enlarged view of the latching assembly depicted in FIG. 3;

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4A, is not intended to limit the scope of the invention, as claimed, but is merely representative of presently preferred embodiments of the invention.

The present invention utilizes a compact airbag module to enhance the design and cost-effectiveness of glove compartment airbag systems. Through the use of a cushion formed substantially of a rigid material, the airbag module is able to be compactly installed in a glove compartment door with a comparatively small amount of installation hardware.

Furthermore, the present invention uses a plurality of inventive, unobtrusive latching concepts to permit latching without interfering with airbag modules installed in glove compartment assemblies. The manner in which the present invention utilizes these principles to provide cost-effective, reliable impact protection will be shown and described in greater detail with reference to FIGS. 1 through 4A.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together.

Figure 1:
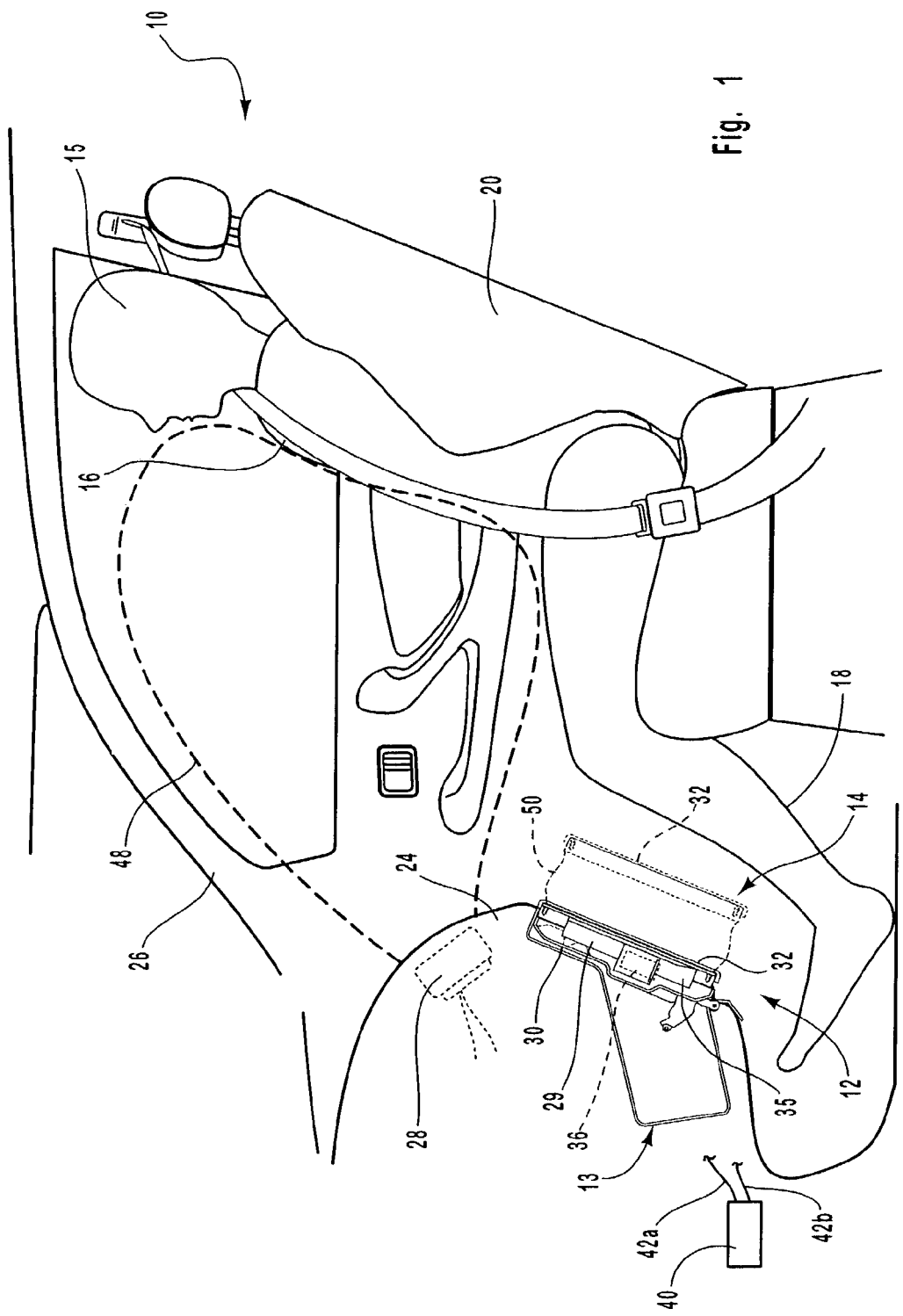
FIG. 1 is a side elevation, section view of a vehicle incorporating one embodiment of a glove compartment assembly, with an integrated knee airbag module, within the scope of the invention.

Referring to FIG. 1, a side elevation, section view depicts an interior portion of a vehicle 10 that incorporates one embodiment of a glove compartment assembly 12 within the scope of the invention. The view of FIG. 1 shows the passenger side of the vehicle 10 because the front seat of the passenger side of the vehicle is where a glove compartment is typically installed. Those of skill in the art will recognize that the structures of the present invention may also be applied to other compartments in the vehicle, such as compartments that open toward the rear seats, or even the driver's seat.

As shown, the glove compartment assembly 12 includes a storage bin 13 and a door 14. The storage bin 13 is configured to hold articles such as instruction manuals, small tools, gloves, and the like. The door 14 is pivotally attached to the storage bin 13 so that the door 14 can swing between open and closed positions.

In FIG. 1, a vehicle occupant 15 having an upper body portion 16 and a lower body portion 18 is shown seated in a front seat 20. The front seat 20 faces an instrument panel 24 and a windshield 26. A primary airbag 28 is contained within the instrument panel 24. The glove compartment assembly 12 is installed in a lower portion of the instrument panel 24 within the vehicle 10.

The glove compartment assembly 12 has a cushion 29, which may be formed of a comparatively rigid material such as a metal, composite, or plastic. The door 14 may generally enclose the cushion 29 between a rear door cover 30 and a front door cover 32, which acts as the "class A" interior surface. The rear and front door covers 30, 32, need not entirely surround the cushion 29, but simply hide it so that a user of the vehicle 10 is unable to see or tamper with the cushion 29.

The front door cover 32 extends from the rear door cover 30 and serves as a bolster for contacting the lower body portion 18 of the occupant 15 during a collision. The front door cover 32 also allows the glove compartment assembly 12 to be visually integrated into the interior of the vehicle 10. As used herein, the term "front" refers to features positioned or oriented toward the vehicle occupant, and the term "rear" refers to features positioned or oriented further from the vehicle occupant.

The rear door cover 30 and the front door cover 32 are coupled together to define an expandable interior volume 35, which is comparatively small when the cushion 29 is in the folded state. The expandable interior volume 35 contains an inflator 36 that produces a quantity of pressurized inflation gas upon receipt of an activation signal. As shown, the inflator 36 is disposed inside the cushion. However, the invention includes airbag modules in which the inflator is disposed outside the cushion or integrated with the cushion. In this application, the term "airbag module" refers to a system that includes an inflator and cushion that receives inflation gas from the inflator.

The vehicle 10 also includes a sensor mechanism 40, which is configured to sense an impact to the vehicle 10. A pair of lead wires 42a–b are attached to the sensor mechanism 40. The lead wires 42a–b provide electrical communication between the sensor mechanism 40 and the inflator 36.

Upon detection of a collision, the sensor mechanism 40 transmits an electrical signal to the inflator 36, as well as a corresponding inflator (not shown) of the primary airbag 28. The inflator 36 and the inflator of the primary airbag 28 each rapidly discharge pressurized inflation gas to induce inflation of the primary airbag 28 and the folded rigid knee airbag module into their respective inflated positions 48 and 50. In its inflated position 48, the primary airbag 28 prevents the upper body portion 16 of the occupant 15 from striking the windshield 26 or the instrument panel 24.

Since the entire body of the occupant 15 must decelerate, there is a tendency for the lower body 18 of the occupant 15 to slide forward, under the primary airbag 28. This lower body motion is referred to as "submarining," and may reduce the protective capacity of the primary airbag 28, especially when the occupant 15 is not properly restrained by a seat belt. In its deployed position 50, the glove compartment assembly 12 prevents submarining, i.e., prevents the lower body portion 18 of the vehicle occupant 15 from sliding forward.

Figure 2:
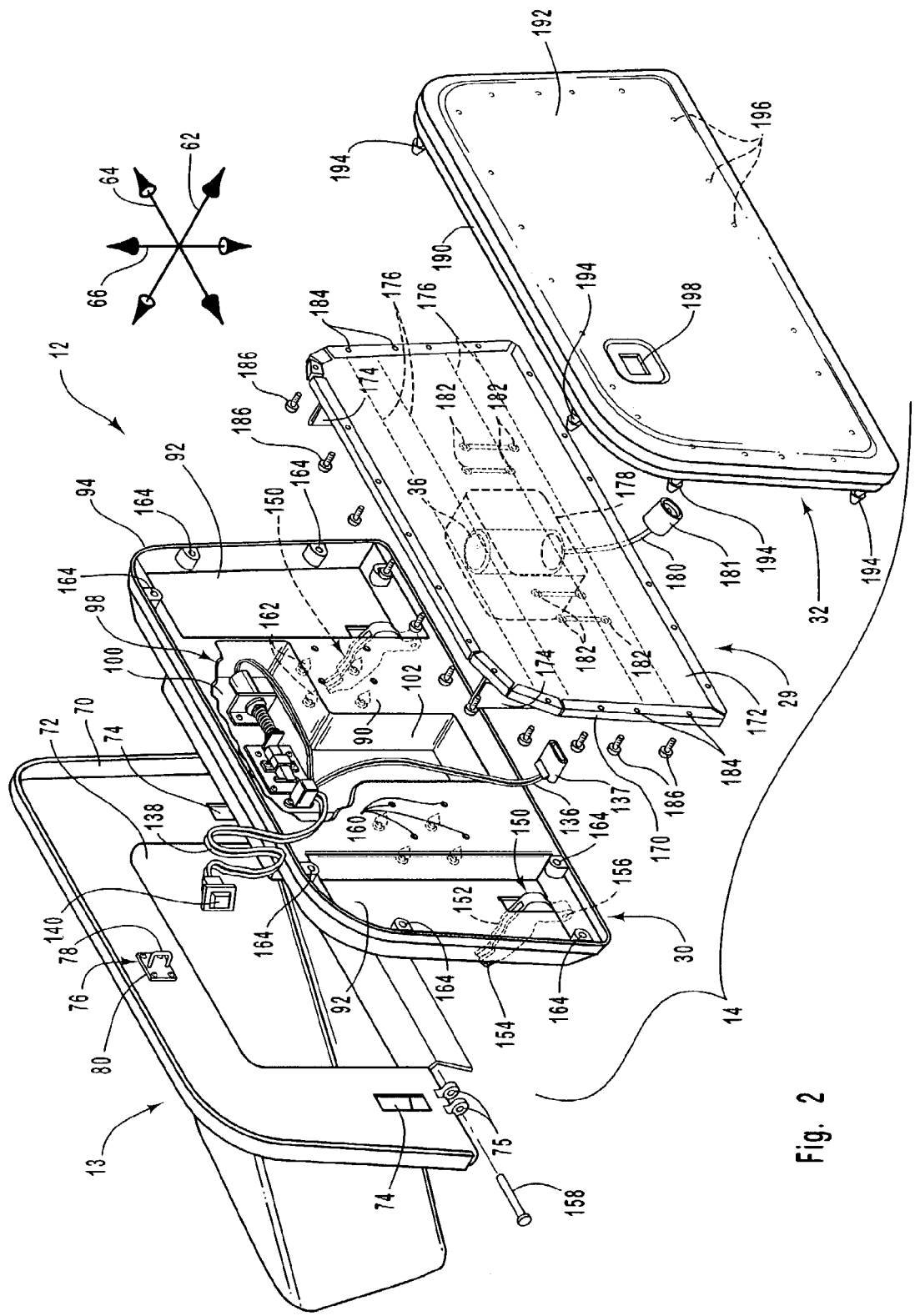
FIG. 2 is an exploded, perspective view of the glove compartment assembly of FIG. 1.

Referring to FIG. 2, an exploded perspective view of the glove compartment assembly 12 of FIG. 1 is shown. The glove compartment assembly 12 has a longitudinal direction 62, a lateral direction 64, and a transverse direction 66. As mentioned previously, the glove compartment assembly has a storage bin 13 and a door 14. The door 14 includes the rear door cover 30, the front door cover 32, and the cushion 29, as well as the inflator 36.

As shown, the storage bin 13 has a peripheral lip 70 that extends toward the door 14 so that the door 14 is able to seat at least partially within the storage bin 13. Additionally, the storage bin 13 has a recessed compartment 72 designed to hold the articles. The recessed compartment 72 may be angled downward somewhat to hold the articles, and to compensate for the somewhat downward facing orientation of the glove compartment assembly 12.

The storage bin 13 also has slots 74 which are oriented generally along the transverse direction 66. The slots 74 cooperate with the rear door cover 30 to limit pivotal motion of the rear door cover 30 with respect to the storage bin 13. Additionally, the storage bin 13 has pivot retention rings 75 designed to pivotally retain the rear door cover 30. A restraint member 76 is attached to the storage bin for latching purposes. The restraint member 76 has a loop 78 that extends longitudinally from an attachment plate 80. The attachment plate 80 is attached to the storage bin 13 via fasteners or a similar mechanism.

Figure 2A:
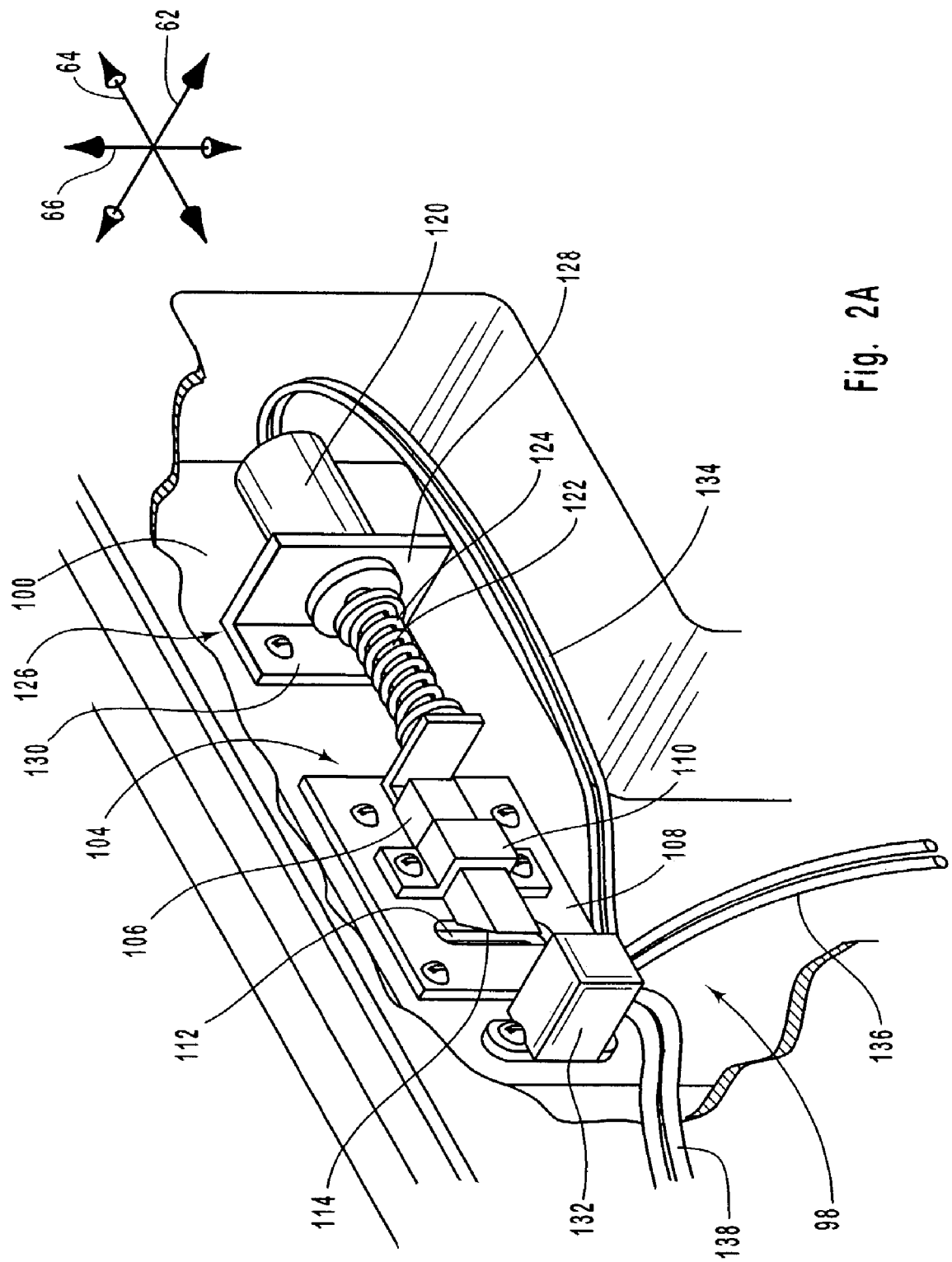
FIG. 2A is an enlarged view of the latching assembly depicted in FIG. 2.

The rear door cover 30 has a central portion 90 disposed between lateral recesses 92. The lateral recesses 92 may provide space in which the cushion 29 can unfold for expansion. A peripheral lip 94 encircles the central portion 90 and the lateral recesses 92 and extends toward the front door cover 32. The central portion 90 has a recess 98, which includes a latch portion 100 and an inflator portion 102. The latch portion 100 contains part of a latching assembly 104, while the inflator portion 102 contains the inflator 36 of the airbag module. The latching assembly 104 is shown in greater detail in the enlarged view of FIG. 2A.

The latching assembly 104 moves between a latched configuration, in which the door 14 is held in the closed position against the storage bin 13, and an unlatched configuration, in which the door 14 is able to pivot with respect to the storage bin 13. The latching assembly 104, as shown, includes the restraint member 76 as well as a locking member 106 designed to interlock with the restraint member 76 in the latched configuration, and to be free of the restraint member 76 in the unlatched configuration.

The locking member 106 may take the form of a latching block 106. As shown, the latching block 106 is slidably attached to an attachment plate 108 via a block retainer 110, so that the latching block 106 is only able to slide in the lateral direction 64 with respect to the attachment plate 108. The attachment plate 108 is attached to the latch portion 100 of the recess 98 via fasteners or the like.

The attachment plate 108 has a slot 112, which is aligned with a corresponding slot (not visible) formed in the latch portion 100 of the recess 98. In the latched configuration, the restraint member 76 extends through the slot of the latch portion 100 and through the slot 112 of the attachment plate 108 to reach the latching block 106.

The latching block 106 has a sloped face 114 oriented generally toward the slot 112 so that motion of the latching block 106 toward the restraint member 76, in the longitudinal direction 62, results in actuation of the latching block 106 in the lateral direction 64, so that the latching block 106 does not impede motion of the restraint member 76 into the slot 112 and into the latch portion 100. Thus, the latching assembly 104 is able to move from the unlatched configuration to the latched configuration automatically when the door 14 is closed against the storage bin 13.

The latching assembly 104 is electrically operated. More precisely, the latching block 106 is driven by a solenoid 120, which is coupled to the latching block 106 via a control rod 122. A spring 124 disposed between the solenoid 120 and the latching block 106 urges the latching block 106 to move laterally into a position in front of the slot 112. Consequently, the latching block 106 tends to remain in a position to interlock with the restraint member 76 in the absence of actuation by the solenoid 120.

The solenoid 120 is attached to the latch portion 100 of the recess 98 via a backing member 126, which has a flange 128 affixed to a lateral face of the solenoid 120 and an attachment plate 130 affixed to the latch portion 100. Fasteners or the like may be used to attach the backing member 126 to the solenoid 120 and the latch portion 100.

The solenoid 120 is electrically coupled to a junction box 132 via solenoid wires 134, which convey electrical power from the junction box 132 to the solenoid 120. The junction box 132 receives power from the electrical system of the vehicle 10 via connection wires 136, which may extend out of the bottom of the door 14 and into the instrument panel 24. The connection wires 136 terminate in a power coupling 137, which may be a plug with a standard configuration designed to mate with a corresponding plug of the electrical system.

A switch wire 138 also extends in a loop from the junction box 132; a user control 140 is positioned on the switch wire 138, at the end of the loop. The user control 140 may take the form of an electric switch. An electric switch is simply a device that can be used to open or close an electric circuit. Thus, the user control 140 may be a button 140, as shown in FIG. 2. When a user presses the button 140, current is permitted to flow through the switch wire 138, thereby completing the circuit between the electrical system of the vehicle 10 and the solenoid 120. In response, the solenoid 120 draws the latching block 106 toward itself, thereby permitting the restraint member 76 to be withdrawn back through the slot 112 to provide the unlatched configuration.

The rear door cover 30 may have a pair of coupling members 150 designed to pivotally attach the rear door cover 30 to the storage bin 13. Each of the coupling members 150 may have a longitudinal extension 152 designed to extend into the corresponding slot 74 of the storage bin 13. Lateral stops 154 extend in the lateral direction 64 from the ends of the longitudinal extensions 152 to limit the extent of pivotal motion between the rear door cover 30 and the storage bin 13. Each of the coupling members 150 also has a hole 156 designed to accept a pin 158 inserted into the pivot retention rings 75 so that the pivot retention rings 75 pivotally retain the coupling member 150, and thence, the rear door cover 30.

A number of cushion attachment holes 160 are formed in the central portion 90 of the rear door cover 30. Fasteners 162 may be inserted through the cushion attachment holes 160 to attach the rear door cover 30 to the cushion 29, for example, via holes 182 in the cushion 29, which may be simple openings or threaded inserts. The fasteners 162 are designed to seat within the cushion 29, rather than extending completely through the cushion 29, so that the fasteners 162 do not impede inflation or gas retention of the cushion 29. Additionally, a plurality of front door cover attachment holes 164 are arrayed about the peripheral lip 94 to facilitate attachment of the rear and front door covers 30, 32.

The cushion 29 has a membrane, or structure designed to receive and contain the pressurized inflation gas, that is at least partially constructed of a substantially rigid material such as a metal, plastic, or composite. In this application, fabric materials are not "substantially rigid materials." According to one example, the membrane is constructed of a metal such as steel. The membrane consists generally of a rear panel 170 and a front panel 172, which are attached together at their edges to retain inflation gas between them. If desired, a gasket or the like (not shown) may be used to restrict inflation gas leakage between the rear and front panels 170, 172.

The rear panel 170 is expandable so that the cushion 29 is able to expand in the longitudinal direction 62. More precisely, the rear panel 170 has transverse folds 174 that protrude longitudinally, into the lateral recesses 92 of the rear door cover 30. Furthermore, the rear panel 170 has lateral folds 176, each of which may consist of two 180° bends in the material of the rear panel 170. The inflator 36 is housed in an inflator alcove 178 attached near the center of the rear panel 170. The inflator alcove 178 fits into the inflator portion 102 of the recess 98 of the rear door cover 30.

Connection wires 180 extend from the inflator 36 to some type of collision management system (not shown), such as a microcontroller. Like the connection wires 136 of the latching assembly 104, the connection wires 180 of the inflator 36 may extend through the bottom of the door 14 and into the instrument panel 24 of the vehicle 10. The connection wires 180 may terminate in a power coupling 181 with a standard configuration designed to mate with a coupling of the collision management system. Upon detection of a collision, the collision management system transmits an activation signal to the inflator 36 via the connection wires 180.

When the inflator 36 deploys, inflation gas from the inflator 36 presses the rear panel 170 and the front panel 172 apart. The transverse folds 174 unfold to permit expansion of the rear panel 170 in the lateral direction 64, and the lateral folds 176 unfold to permit expansion of the rear panel 170 in the transverse direction 66. The enlarged rear panel 170 bends forward at the edges to permit the front panel 172 to extend toward the user of the vehicle 10.

The rear panel 170 has a plurality of rear door cover attachment holes 182 aligned with the cushion attachment holes 160 of the rear door cover 30. The fasteners 162 terminate within the cushion 29, i.e., between the rear and front panels 170, 172. According to one example, the fasteners 162 are plastic rivets that can be pressed through the cushion attachment holes 160, and then through the rear door cover attachment holes 182. Once inside the cushion 29, the tips of the plastic rivets expand to prevent retraction of the plastic rivets back through the rear door cover attachment holes 182.

In the alternative, the fasteners 162 may be bolts that are inserted first through the rear door cover attachment holes 182, and then through the cushion attachment holes 160. This requires that the bolts be inserted prior to attachment of the rear and front panels 170, 172 of the cushion 29. Nuts may then be threaded onto the tips of the bolts, proximate the cushion attachment holes 160, to complete the attachment.

The rear and front panels 170, 172 may be attached together at their edges in a variety of ways, including spot welding, RF welding, ultrasonic welding, chemical or adhesive bonding, or fastening. As shown in FIG. 2, the rear and front panels 170, 172 may have a plurality of front door cover attachment holes 184 distributed about their edges. Fasteners 186, such as screws, may be inserted through the front door cover attachment holes 184 and seated in the front door cover 32 so that the fasteners 186 attach the panels 170, 172 together and also attach the cushion 29 to the front door cover 32.

The front door cover 32 has a peripheral lip 190 that encircles a central portion 192. A plurality of frangible attachment members 194 extend from peripheral lip 190 in the longitudinal direction 62, toward the peripheral lip 94 of the rear door cover 30. The frangible attachment members 194 are aligned with the front door cover attachment holes 164 of the rear door cover 30. Each of the frangible attachment members 194 may have a generally barbed configuration configured to mate with the shape of the front door cover attachment holes 164.

Consequently, the rear and front door covers 30, 32 can be relatively easily snapped together in such a manner that the cushion 29 is enclosed within the rear and front door covers 30, 32. In response to pressure between the rear and front door covers 30, 32, the barbs are sheared from the frangible attachment members 194 so that the front and rear door covers 30, 32 are able to separate. The frangible attachment members 194 need not be barbed, but may have any other configuration designed to release upon the application of a threshold separation pressure. For example, interference fit members, hooked members, separate releasable locking fasteners, or the like may be used to attach the rear and front door covers 30, 32 together.

Cushion attachment holes 196 are formed in the central portion 192, near the peripheral lip 190. The cushion attachment holes 196 receive the fasteners 186; consequently, the cushion attachment holes 196 may be threaded to firmly retain the fasteners 186. Through the use of the cushion attachment holes 196 and fasteners 186, the cushion 29 is attached to the central portion 192 of the front door cover 32.

The central portion 192 also has a window 198 designed to provide user access to the button 140. More precisely, the button 140 is attached to the front door cover 32 at the periphery of the window 198 so that the button 140 is exposed through the window 198. A user may thus easily unlatch and open the glove compartment assembly 12 by pressing the button 140.

The switch wire 138 extends around the cushion 29, for example, over the top of the cushion 29, to move between the button 140 and the junction box 132. Prior to inflation, there is extra slack in the switch wire 138. Hence, when the cushion 29 inflates, the switch wire 138 does not impede motion of the rear and front door covers 30, 32 away from each other.

The compact, simple construction of the airbag module, in addition to the use of the electrically operated latching assembly 104, makes the glove compartment assembly 12 comparatively inexpensive, compact, and simple. However, such benefits may also be obtained from a mechanical latching system in combination with an alternative door configuration. A glove compartment assembly that incorporates a mechanical latch and a rigid airbag cushion will be shown and described in connection with FIG. 3.

Figure 3:
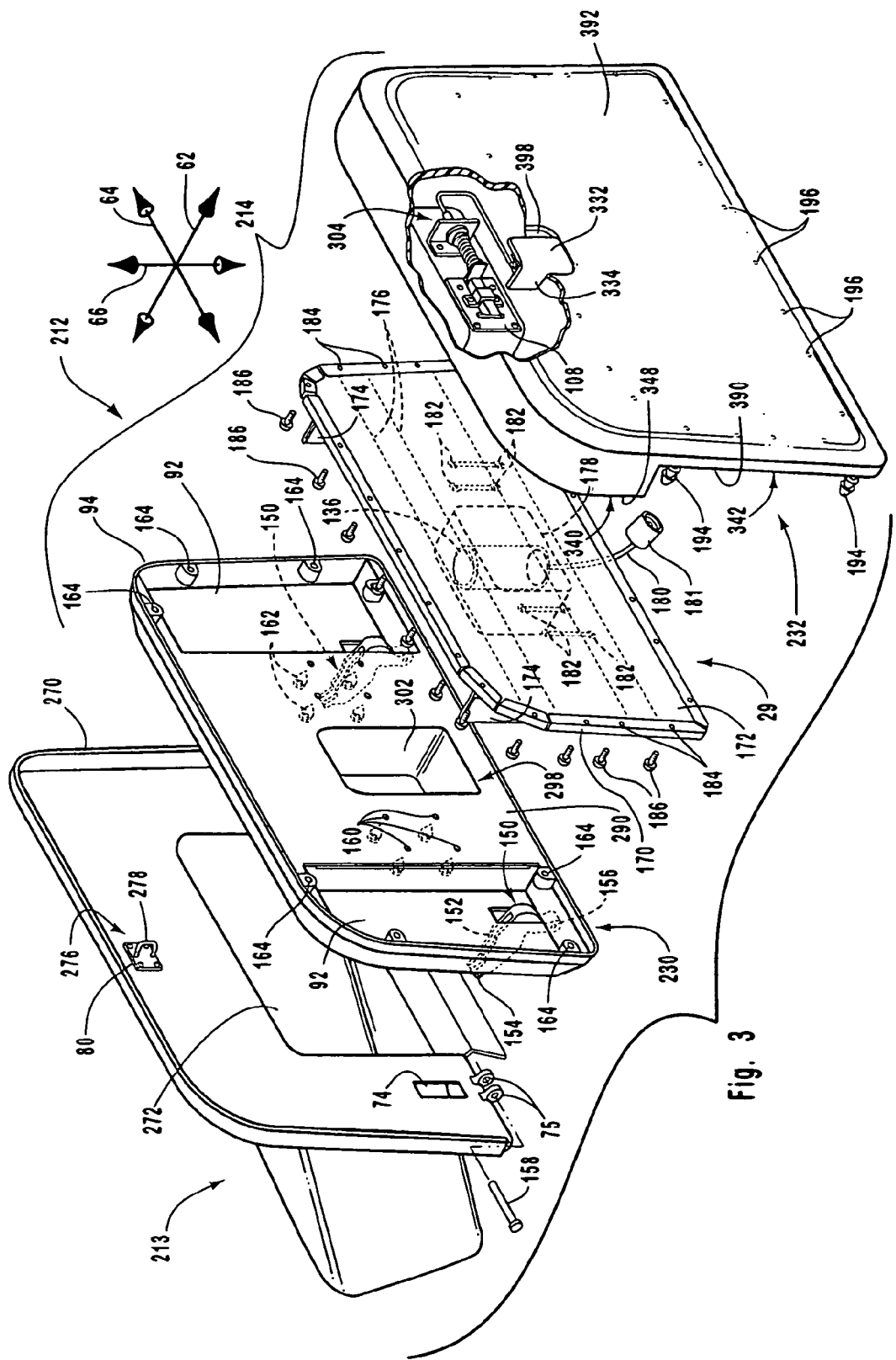
FIG. 3 is an exploded, perspective view of an alternative embodiment of a glove compartment assembly according to the invention.

Referring to FIG. 3, an exploded, perspective view illustrates a glove compartment assembly 212 according to another embodiment of the invention. The glove compartment assembly 212 has a storage bin 213 and a door 214, each of which may be somewhat taller (i.e., in the transverse direction 66) than the storage bin 13 and the door 14 of the previous embodiment. The door 214 includes an airbag module with an inflator 36 and a cushion 29, both of which may be the same as those of the previous embodiment. Additionally, the door 214 includes a rear door cover 230 and a front door cover 232 that generally enclose the airbag module during normal vehicle operation.

Like that of the previous embodiment, the storage bin 213 has a peripheral lip 270 that extends toward the door 214. Additionally, the storage bin 213 has a recessed compartment 272 that holds articles. The storage bin 213 has slots 74 that function in a manner similar to the slots 74 of the previous embodiment to limit the rotational displacement of the door 214. Pivot retention rings 75 pivotally retain the door 214.

Additionally, the storage bin 213 has a restraint member 276 designed to retain the door 214 in the latched position. The restraint member 276 has a loop 278 with a pair of weakened portions 279 designed to fail upon the application of a threshold tensile force. Thus, if the door 214 pulls against the restraint member 276 with a sufficient force, the loop 278 will break at the weakened portions 279 to permit withdrawal of the door 214 from the storage bin 213. The loop 278 is attached to the storage bin 213 via an attachment plate 80, which may be fastened or otherwise attached to the storage bin 213.

The rear door cover 230 has a configuration somewhat similar to the rear door cover 30 of the previous embodiment. The rear door cover 230 has a central portion 290, lateral recesses 92 disposed on either side of the central portion 290, and a peripheral lip 94 that encircles the central portion 290 and the lateral recesses 92. The central portion 290 has a recess 298 that does not include a latch portion because the latching assembly is not disposed on the rear door cover 230. Thus, the recess 298 only includes an inflator portion 302 designed to receive the inflator 36 of the airbag module.

The glove compartment assembly 212 has a latching assembly 304 disposed on the front door cover 232. The latching assembly 304 is shown in greater detail in the enlarged view of FIG. 3A. The latching assembly 304 has a number of components that are similar to those of the latching assembly 104 of FIG. 2. More precisely, the latching assembly 304 has a locking member 106, or a latching block 106, an attachment plate 108, and a block retainer 110 that are all configured in a manner similar to the previous embodiment. The attachment plate 108 has a slot 112 through which the loop 278 extends, and the latching block 106 has a sloped face 114 designed to permit the latching assembly 304 to automatically latch when the door 214 is closed.

The latching assembly 304 has a user control 320 designed to mechanically actuate the latching block 106. More precisely, the user control 320 may take the form of a handle 320 that abuts a control rod 322 coupled to the latching block 106. A spring 124 is used to bias the latching block 106 to the position in front of the slot 112. The spring 124 is disposed on the control rod 322, between the latching block 106 and a backing member 326. The backing member 326 has a flange 328 that protrudes longitudinally from an attachment plate 330 attached to the interior of the front door cover 232.

The handle 320 has a grip portion 332 and an angled extension 334 that extends rearward of the grip portion 332 to contact the control rod 322. Pivot extensions 335 extend in the transverse direction 66 from the top and bottom sides of the handle 320, and are seated within corresponding openings (not shown) in the front door cover 232. A torsional spring 336 exerts a torque tending to keep the handle oriented such that the grip portion 332 is generally parallel to the exposed face of the front door cover 232, unless the user is acting to draw the grip portion 332 outward.

When the grip portion 332 is drawn outward by the user, the angled extension 334 pivots to press against a distal end 337 of the control rod. The control rod then compresses the spring 124 and draws the latching block 106 out from in front of the slot 112, thereby removing the latching block 106 from interlocking with the loop 278. Thus, the latching assembly 304 may be mechanically unlatched to permit the door 214 to be opened.

The front door cover 232 has a latching portion 340 that contains the latching assembly 304, aside from the restraint member 276. Additionally, the front door cover 232 has a cushion attachment portion 342 designed to receive the cushion 29 and the rear door cover 230. More precisely, the latching portion 340 has an inward surface 348 designed to abut the storage bin 213.

The rear door cover 230 is coupled to the storage bin 213 in a manner similar to that of the previous embodiment. More specifically, coupling members 150 are disposed on the rearward side of the rear door cover 230. Each of the coupling members 150 has a longitudinal extension 152 designed to be inserted into one of the slots 74 of the storage bin 213. Lateral stops 154 extend laterally from the longitudinal extensions 152 to limit the range of pivotal motion of the door 214. A hole 156 cooperates with a pin 158 and the pivot retention rings 75 to pivotally attach the rear door cover 230 to the storage bin 213.

The rear door cover 230 has cushion attachment holes 160 that permit the central portion 290 of the rear door cover 230 to be attached to the cushion 29 via fasteners 162. Additionally, the rear door cover 230 has front door cover attachment holes 164 disposed on the peripheral lip 94 to facilitate attachment of the peripheral lip 94 to the cushion attachment portion 342.

The cushion 29 is the same as that of the previous embodiment. More precisely, the cushion 29 has a rear panel 170 and a front panel 172. The rear panel 170 has transverse folds 174 and lateral folds 176, and is attached to an inflator alcove 178 that contains the inflator 36. The inflator 36 receives power from a collision management system via connection wires 180 that terminate in a power coupling 181. The rear panel 170 has rear door cover attachment holes 182, which are optionally threaded and are designed to receive the fasteners 162. Additionally, the cushion 29 has front door cover attachment holes 184 disposed about the periphery of the cushion 29, so that the cushion 29 can be attached to the front door cover 232 via fasteners 186.

The cushion attachment portion 342 has a peripheral lip 390 that generally encircles a central portion 392. The peripheral lip 390 faces toward the rear door cover 230. As with the previous embodiment, frangible fastening mechanisms 194 are disposed on the peripheral lip 390 and are oriented toward the peripheral lip 94 of the rear door cover 230. The frangible fastening mechanisms 194 are inserted into the front door cover attachment holes 164 of the rear door cover 230 so that the rear and front door covers 230, 232 can separate when the cushion 29 inflates.

The cushion attachment portion 342 also has a plurality of cushion attachment holes 196 arrayed within the peripheral lip 390 to receive the fasteners 186, thereby permitting attachment of the cushion 29 to the cushion attachment portion 342. Furthermore, the front door cover 232 has a window 398 through which the handle 320 of the latching assembly 304 is exposed for user access.

Deployment of the airbag module of the glove compartment assembly 212 is somewhat similar to that of the previous embodiment. In response to detection of a collision, an activation signal is transmitted to the inflator 36. The inflator 36 produces inflation gas to inflate the cushion 29. During inflation, the cushion 29 presses the rear and front door covers 230, 232 apart. As a result, the frangible fastening mechanisms 194 break to permit separation of the rear and front door covers 230, 232, and the loop 278 also breaks to permit withdrawal of the front door cover 232 from the storage bin 213.

Therefore, the latching assembly 304 unlatches in response to deployment of the airbag module. The door 214 as a whole is thus free to rotate into the open position, but deployment of the airbag module, and subsequent impact of the lower body portion 18 against the front door cover 232 is so rapid that movement of the door 214 does not significantly hinder the protective capability of the glove compartment assembly 212.

The glove compartment assembly 212 utilizes breakaway mechanical latching to facilitate deployment of the airbag module. According to alternative embodiments of the invention, a latching assembly may be entirely removed from the door of the glove compartment assembly. Furthermore, the cushion of the airbag module may be integrated with the front door cover. Such an embodiment will be shown and described in connection with FIG. 4.

Figure 4:
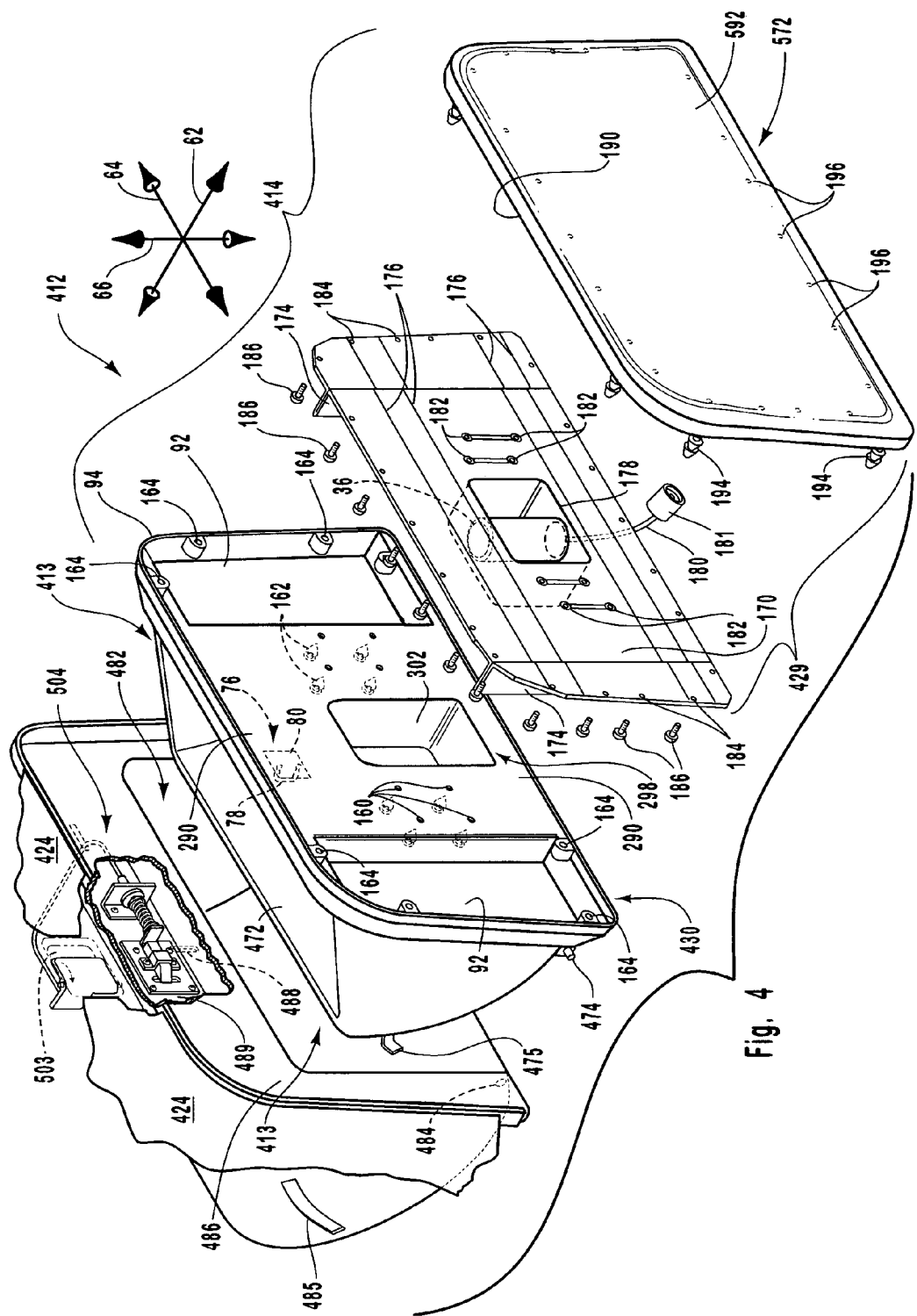
FIG. 4 is an exploded, perspective view of another alternative embodiment of a glove compartment assembly according to the invention.
Figure 4A:
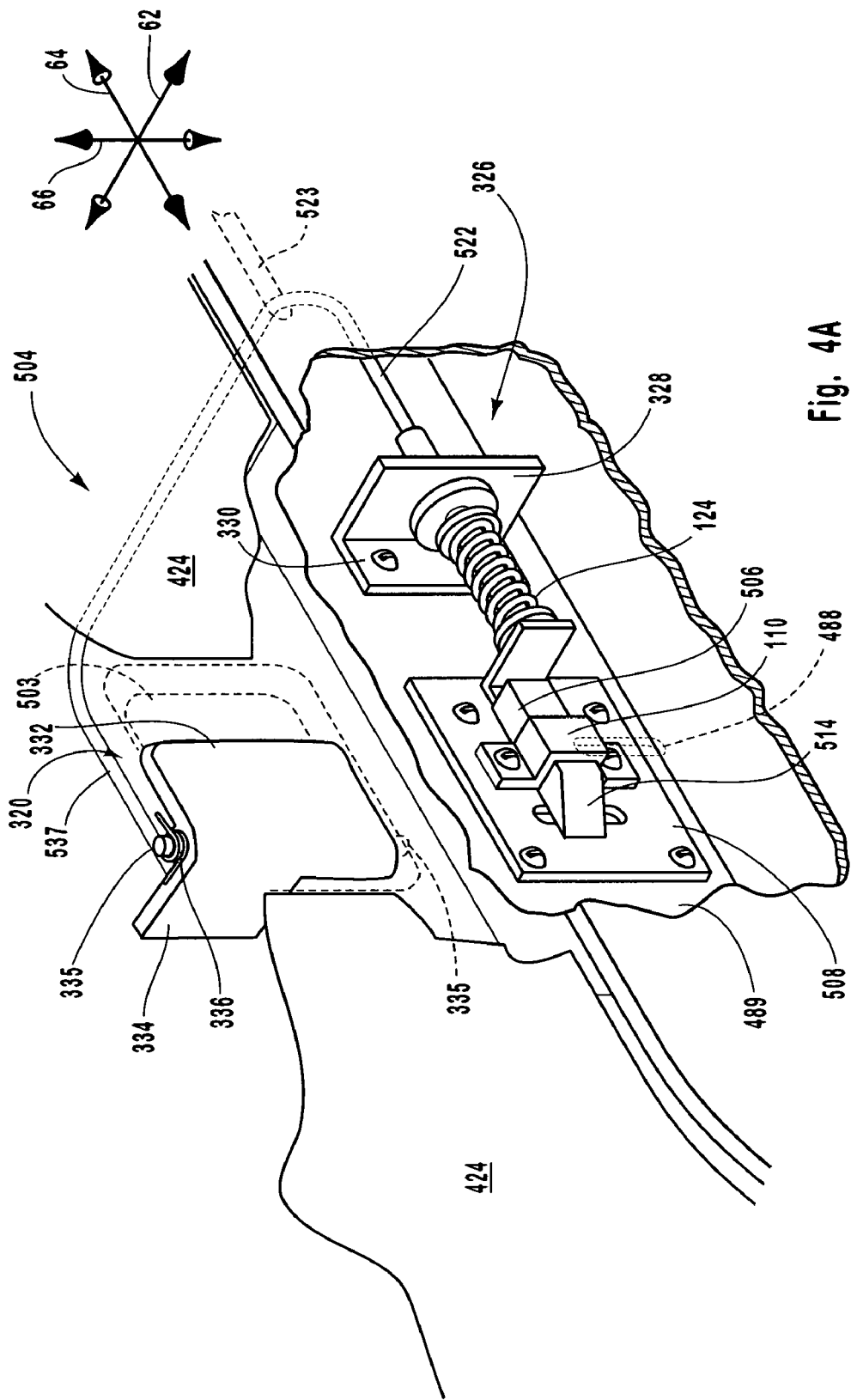
FIG. 4A is an enlarged view of the latching assembly depicted in FIG. 4.

Referring to FIG. 4, an exploded, perspective view shows a glove compartment assembly 412 according to another alternative embodiment of the present invention. The glove compartment assembly 412 is of a somewhat different type than those of the previous embodiments. More precisely, the glove compartment assembly 412 has a storage bin 413 rigidly attached to a door 414. The door 414 and the storage bin 413 both rotate with respect to an instrument panel 424. The glove compartment assembly 412 is opened by pivoting the storage bin 413 out from within the instrument panel 424.

The door 414 has an airbag module that includes an inflator 36 and a cushion 429. Furthermore, the door 414 has a rear door cover 430 rigidly attached to the storage bin 413. The storage bin 413 has a pivoting compartment 472, which may be generally wedge-shaped. Pivot extensions 474 extend in the lateral direction 64 from either side of the pivoting compartment 472. Stops 475 are attached to the rearward side of the pivoting compartment 472 to limit the rotational travel of the storage compartment 413 and the door 414 with respect to the instrument panel 424.

A restraint member 76 is disposed in the rearward side of the rear door cover 430, and has the same configuration as that of FIG. 2. More precisely, the restraint member 76 has a loop 78 that extends in the longitudinal direction 62 toward the instrument panel 424. The loop 78 is attached to an attachment plate 80, which is, in turn, attached to the rear door cover 430 by fasteners or the like.

The storage bin 413 is made to generally fit into a compartment 482 of the instrument panel 424. The compartment 482 may have a wedge shape slightly larger than that of the pivoting compartment 472. The compartment 482 has a pair of pivot holes 484, each of which is designed to receive one of the pivot extensions 474 of the storage bin 413. Furthermore, the compartment 482 has a pair of arced slots 485 that are designed to receive the stops 475 of the storage bin 413. More precisely, the stops 475 extend into the arced slots 485 and rest against the forward edges of the arced slots 485 when the glove compartment assembly 412 is fully open.

Additionally, the compartment 482 has a forward wall 486 that extends along the upper rim of the compartment 482. A slot 488 in the forward wall 486 permits the loop 78 to extend through the forward wall 486 when the door 414 is closed. The compartment 482 also has a rearward wall 489 parallel to and rearward of the forward wall 486.

The rear door cover 430 is configured in a manner similar to that of the previous embodiment. More precisely, the rear door cover 430 has a central portion 290, a pair of lateral recesses 92, and a peripheral lip 94. The central portion 290 has a recess 298 with an inflator portion 302 designed to receive the inflator 36.

The instrument panel 424 has a window 503 designed to permit user actuation of a latching assembly 504, which is disposed on the instrument panel 424, with the exception of the restraint member 76. The latching assembly 504 is shown in greater detail in the enlarged view of FIG. 4A. The latching assembly 504 is mechanically operated, and has a configuration somewhat similar to that of the latching assembly 304 of the previous embodiment.

More specifically, the latching assembly 504 has a locking member 506 configured as a latching block 506, which is slidably coupled to the rearward wall 489 via an attachment plate 508 and a block retainer 110. The attachment plate 508 may or may not have a slot, and may be attached to the rearward wall 489 via fasteners or the like. The latching block 506 has a sloped face 514 oriented generally toward the forward wall 486 and the slot 488, rather than the attachment plate 508.

The latching assembly 504 also has a user control 320, or handle 320, like that of the previous embodiment. The handle 320 is coupled to the latching block 506 via a control rod 522. The control rod may extend from the handle 320 through a slot 523 in the rearward wall 489 to reach the latching block 506. In the alternative, the rearward wall 489 may simply terminate at a position selected to avoid interference with passage of the control rod 522.

Like the latching assembly 304, the latching assembly 504 includes a spring 124 designed to bias the latching block 506 into alignment with the slot 488, and a backing member 326 that cooperates the spring 124. The backing member 326 has a flange 328 that abuts the spring 124 and an attachment plate 330 used to attach the backing member 326 to the rearward wall 489 via fasteners or the like.

The handle 320 has a grip portion 332 accessible through the window 503, an angled extension 334, and a pair of pivot extensions 335 that extend into the instrument panel 424 in the transverse direction 66 to pivotally attach the handle 320 within the window 503. A torsional spring 336 rotationally biases the handle 320 so that the grip portion 332 is generally parallel to the window 503.

When the user pulls the grip portion 332, the angled extension 334 rotates to push a distal end 537 of the control rod 522 in the lateral direction 64. As a result, the spring 124 is compressed and the latching block 506 is drawn out of alignment with the slot 488, and therefore out of an interlocking position with the restraint member 76 so that the glove compartment assembly 412 moves to the unlatched configuration. The door 414 may then be opened to rotate the pivoting compartment 472 out of the compartment 482 of the instrument panel 424.

The rear door cover 430 has cushion attachment holes 160 designed to permit attachment of the central portion 290 of the rear door cover 430 to the cushion 429. Fasteners 162, such as plastic rivets, bolts, screws, or the like may be used for this purpose.

The cushion 429 is configured somewhat differently than in previous embodiments. More precisely, the cushion 429 has a rear panel 170 and a front door cover 572 attached to the periphery of the rear panel 170. The front door cover 572 takes the place of the front panel 172 of the previous embodiments, and also serves a function similar to that of the front door covers 32, 232 of the previous embodiments. Inflation gas thus flows directly into the space between the rear panel 170 and the front door cover 572.

As with previous embodiments, the rear panel 170 has transverse folds 174 and lateral folds 176 that permit the rear panel 170 to expand in the lateral and transverse directions 64, 66, respectively. An inflator alcove 178 attached to the rear panel 170 contains the inflator 36. The inflator 36 receives an activation signal via connection wires 180, which are coupled to a collision management system via a power coupling 181.

The rear panel 170 has rear door cover attachment holes 182, which may be threaded and are aligned with the cushion attachment holes 160 of the rear door cover 430. Furthermore, the rear panel 170 has front door cover attachment holes 184 arrayed about a periphery of the rear panel 170. The rear panel 170 is attached to the front door cover 572 via fasteners 186, which may be screws or the like. Alternatively, the front door cover 572 may be formed of a weldable thermoplastic material that can be heat staked to the rear panel 170 using thermoplastic welding techniques known in the art. If desired, a gasket or the like (not shown) may be used to restrict inflation gas leakage between the rear panel 170 and the front door cover 572.

The front door cover 572 has a peripheral lip 190 that generally encircles a central portion 592. The peripheral lip 190 extends toward the peripheral lip 94 of the rear door cover 430 so that the peripheral lips 190, 94 can be attached through the use of frangible fastening mechanisms 194. As with previous embodiments, the frangible fastening mechanisms 194 extend into the front door cover attachment holes 164, and break when the cushion 429 inflates to permit separation of the front door cover 572 from the rear door cover 430. The central portion 592 also has cushion attachment holes 196 that receive the fasteners 186 so that the rear panel 170 is attached to the front door cover 572, inward of the peripheral lip 190.

Upon detection of a collision, the inflator 36 receives the activation signal and expels inflation gas into the cushion 429. The cushion 429 inflates to extend the front door cover 572 of the cushion 429 toward the knees of a vehicle user to provide antisubmarining protection. The latching assembly 504 is positioned "remotely," i.e., almost wholly on the instrument panel 424, and therefore does not interfere with the operation of the cushion 429. Thus, effective antisubmarining protection may be provided with a simplified cushion design, and with a "remote" mechanical latch.

The glove compartment assemblies of the present invention provide significant improvements in airbag design. Through the use of compact airbag designs that incorporate rigid cushions, glove compartment assemblies that incorporate airbags can be easily produced and installed in vehicles to provide cost-effective impact protection. Inventive latching systems may be used to further enhance the flexibility and cost-effectiveness of glove compartment airbag modules to improve the overall protection afforded by the vehicular airbag system.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A latching assembly for a door of a glove compartment assembly of a vehicle, the door comprising a rear door cover movably coupled to an instrument panel of the vehicle, the rear door cover having at least one lateral recess, an airbag module coupled to the rear door cover, the airbag module having a cushion configured to inflate, and a front door cover attached to the cushion to extend toward knees of a user of the vehicle during inflation of the cushion, the latching assembly comprising:
   a user control disposed on the front door cover to permit a user to actuate the latching assembly from a latched configuration to an unlatched configuration, thereby permitting motion of the rear door cover with respect to the instrument panel;
   a restraint member coupled to the instrument panel; and
   a locking mechanism configured to interlock with the restraint member to provide the latched configuration, wherein the locking mechanism is configured to withdraw from interlocking with the restraint member in response to activation of the user control to provide the unlatched configuration;
   wherein the user control comprises an electric switch configured to transmit an electric unlatching signal via a switch wire to induce the locking mechanism to withdraw from interlocking with the restraint member and wherein the user control is extensible from the rear door cover in response to inflation of the cushion to permit separation of the front and rear door covers.

2. The latching assembly of claim 1, wherein the locking mechanism is driven by a solenoid.

3. The latching assembly of claim 1, wherein the switch wire has a length selected to enable extension of the electric switch from the rear door cover during inflation of the cushion.

4. The latching assembly of claim 1, wherein the cushion comprises a membrane formed at least partially of a substantially rigid material configured to deflect to permit inflation of the cushion.

5. A method for protecting a vehicle user in the event of a collision through the use of a glove compartment assembly comprising a storage bin, a rear door cover movably coupled to the storage bin, the rear door cover having at least one lateral recess, a front door cover coupled to the rear door cover, and a latching assembly comprising a user control disposed on the front door cover to permit a user to actuate the latching assembly from a latched configuration to an unlatched configuration, thereby permitting motion of the rear door cover with respect to the storage bin, the latching assembly comprising a restraint member disposed on the storage bin, a locking mechanism configured to interlock with the restraint member to provide the latched configuration, and an electric switch configured to transmit an electric unlatching signal via a switch wire to induce the locking mechanism to withdraw from interlocking with the restraint member, wherein the switch wire has a length selected to enable extension of the electric switch from the rear door cover during inflation of a cushion disposed between the front and rear door covers;
   the method comprising:
   activating an inflator to produce inflation gas to provide pressure between the front and rear door covers; and moving the front door cover and the user control away from the rear door cover and toward knees of a user of the vehicle to provide protection in response to the pressure.

6. The method of claim 5, wherein providing pressure between the front and rear door covers comprises directing the inflation gas into the cushion disposed between the front and rear door covers.

7. The method of claim 5, wherein the front door cover is attached to the rear door cover via at least one frangible fastening mechanism, wherein moving the front door cover and the user control away from the rear door cover comprises breaking the frangible fastening mechanism.

* * * * *